United States Patent
Tanigawa et al.

(10) Patent No.: US 8,960,586 B2
(45) Date of Patent: Feb. 24, 2015

(54) FILAMENT WINDING DEVICE

(75) Inventors: Motohiro Tanigawa, Kyoto (JP);
Tadashi Uozumi, Kyoto (JP); Daigoro Nakamura, Kyoto (JP); Ken Hatta, Toyota (JP)

(73) Assignees: Murata Machinery, Ltd., Kyoto (JP);
Toyota Jidosha Kabushiki Kaisha, Aichi (JP)

( * ) Notice: Subject to any disclaimer, the term of this patent is extended or adjusted under 35 U.S.C. 154(b) by 92 days.

(21) Appl. No.: 13/876,151

(22) PCT Filed: Sep. 21, 2011

(86) PCT No.: PCT/JP2011/071532
§ 371 (c)(1),
(2), (4) Date: Mar. 26, 2013

(87) PCT Pub. No.: WO2012/043343
PCT Pub. Date: Apr. 5, 2012

(65) Prior Publication Data
US 2013/0200199 A1    Aug. 8, 2013

(30) Foreign Application Priority Data
Sep. 27, 2010  (JP) .................................. 2010-215878

(51) Int. Cl.
*B21C 47/02*  (2006.01)
*B65H 54/28*  (2006.01)
(Continued)

(52) U.S. Cl.
CPC ............ *B65H 54/28* (2013.01); *B29C 53/8016* (2013.01); *B29C 53/602* (2013.01)
USPC ..................... 242/444; 242/438.1; 242/439.6; 242/445.1

(58) Field of Classification Search
USPC ............ 242/438.1, 439.1, 439.2, 439.6, 444, 242/444.3, 445.1
See application file for complete search history.

(56) References Cited

U.S. PATENT DOCUMENTS 8,510,932 B2 * 8/2013 Meinke ........................... 29/605
2009/0126875 A1   5/2009 Uozumi et al. ................ 156/425
(Continued)

FOREIGN PATENT DOCUMENTS

JP  2004-314550   11/2004
JP  2004314550 A  11/2004
(Continued)

OTHER PUBLICATIONS

English language translation of international preliminary report on patentability dated Apr. 16, 2013 issued in corresponding PCT application PCT/JP2011/071532.

*Primary Examiner* — Emmanuel M Marcelo
(74) *Attorney, Agent, or Firm* — DLA Piper LLP (US)

(57) ABSTRACT

A filament winding device enables fiber bundles to be wound around the outer circumference surface of a liner at equal intervals even when the winding angle of the fiber bundles changes. The filament winding device includes a first helical head on which fiber bundle guides are radially disposed in the periphery of a liner to be transported; and a second helical head which is disposed adjacent to the first helical head and on which the fiber bundle guides are radially disposed in the periphery of the liner The filament winding device also has phase adjusting means for adjusting the phase difference between the fiber bundle guides on the first helical head and and on the second helical head in accordance with the angle (θ) at which the fiber bundle is wound around the liner.

2 Claims, 10 Drawing Sheets

(51) Int. Cl.
*B29C 53/80* (2006.01)
*B29C 53/60* (2006.01)

(56) References Cited

U.S. PATENT DOCUMENTS

2010/0032510 A1 2/2010 Tanigawa et al. .............. 242/430

2013/0186996 A1* 7/2013 Tanigawa et al. ............. 242/444

FOREIGN PATENT DOCUMENTS

| JP | 2009-119803 | 6/2009 |
| JP | 2010-005831 | 1/2010 |
| JP | 2010005831 A | 1/2010 |
| JP | 2010-036461 | 2/2010 |

* cited by examiner

FILAMENT WINDING DEVICE

CROSS REFERENCE TO RELATED APPLICATIONS

This application is a national stage of international application PCT/JP2011/071532, filed on Sep. 21, 2011, and claims the benefit of priority under 35 USC 119 of Japanese application 2010-215878, filed on Sep. 27, 2010, which are incorporated herein by reference.

TECHNICAL FIELD

The present invention relates to an art of a filament winding device.

BACKGROUND ART

Conventionally, a filament winding device is known which winds a fiber bundle, into which resin is infiltrated, around an outer peripheral surface of a liner. The filament winding device has a helical head in which a plurality of fiber bundle guides are provided radially so that a plurality of fiber bundles can be wound around the outer peripheral surface of the liner simultaneously (for example, see the Patent Literature 1).

However, a guide support device supporting the fiber bundle guides has a structure moving and rotating the fiber bundle guides and is resultingly complicated, whereby it has been considered to be difficult to provide radially all the plurality of the fiber bundle guides. Accordingly, a filament winding device is proposed in which fiber bundle guides are arranged in a plurality of lines along a transport direction of a liner so as to provide large numbers of the fiber bundle guides.

However, the filament winding device in which the fiber bundle guides are arranged in the plurality of the lines along the transport direction of the liner, has a problem in that the fiber bundle cannot be wound around the outer peripheral surface of the liner at equal intervals when the winding angle of the fiber bundle is changed.

PRIOR ART REFERENCE

Patent Literature

Patent Literature 1: the Japanese Patent Laid Open Gazette 2010-36461

Disclosure of Invention

SUMMARY OF THE INVENTION

Problems to be Solved by the Invention

The purpose of the present invention is to provide an art for enabling fiber bundle to be wound around the outer peripheral surface of the liner at equal intervals even when the winding angle of the fiber bundle is changed in the filament winding device in which fiber bundle guides are arranged in a plurality of lines along a transport direction of a liner.

Means for Solving the Problems

Next, an explanation will be given on means for solving the problems.

According to the first invention, a filament winding device includes a first helical head in which fiber bundle guides are provided radially around a transported liner, and a second helical head adjacent to the first helical head and in which fiber bundle guides are provided radially around the transported liner. The filament winding device further includes a phase adjusting means which adjusts a phase difference between the fiber bundle guides of the first helical head and the fiber bundle guides of the second helical head in accordance with a winding angle of the fiber bundle.

According to the second invention, in the filament winding device according to the first invention, the phase difference between the fiber bundle guides of the first helical head and the fiber bundle guides of the second helical head is regarded as a standard in the case in which the fiber bundles wound around an outer peripheral surface of the liner are arranged at equal intervals, when a winding angle of the fiber bundles is a predetermined value. When the winding angle of the fiber bundles is larger than the predetermined value, the phase adjusting means drives the first helical head or the second helical head so as to reduce the phase difference between the fiber bundle guides of the first helical head and the fiber bundle guides of the second helical head, whereby the fiber bundles are wound at equal intervals.

According to the third invention, in the filament winding device according to the first invention, the phase difference between the fiber bundle guides of the first helical head and the fiber bundle guides of the second helical head is regarded as a standard in the case in which the fiber bundles wound around an outer peripheral surface of the liner are arranged at equal intervals, when a winding angle of the fiber bundles is a predetermined value. When the winding angle of the fiber bundles is smaller than the predetermined value, the phase adjusting means drives the first helical head or the second helical head so as to increase the phase difference between the fiber bundle guides of the first helical head and the fiber bundle guides of the second helical head, whereby the fiber bundles are wound at equal intervals.

Effect of the Invention

The present invention brings following effects.

According to the first invention, the fiber bundle guided by the fiber bundle guides of the second helical head can be drawn to an arbitrary position between the fiber bundles guided by the fiber bundle guides of the first helical head. Accordingly, the winding mode of the fiber bundles can be changed freely. Then, the fiber bundles can be wound around the outer peripheral surface of the liner at equal intervals.

According to the second invention, when the winding angle of the fiber bundle is larger than the predetermined value, the fiber bundle guided by the fiber bundle guides of the second helical head can be drawn to a middle position between the fiber bundles guided by the fiber bundle guides of the first helical head. Accordingly, the fiber bundles can be wound around the outer peripheral surface of the liner at equal intervals.

According to the third invention, when the winding angle of the fiber bundle is smaller than the predetermined value, the fiber bundle guided by the fiber bundle guides of the second helical head can be drawn to a middle position between the fiber bundles guided by the fiber bundle guides of the first helical head. Accordingly, the fiber bundles can be wound around the outer peripheral surface of the liner at equal intervals.

BRIEF DESCRIPTION OF DRAWINGS

cawing

DETAILED DESCRIPTION OF THE INVENTION

Firstly, an explanation will be given on entire construction of a filament winding device (hereinafter, referred to as "FW device") 100 according to an embodiment of the present invention referring to FIG. 1.

Figure 1:
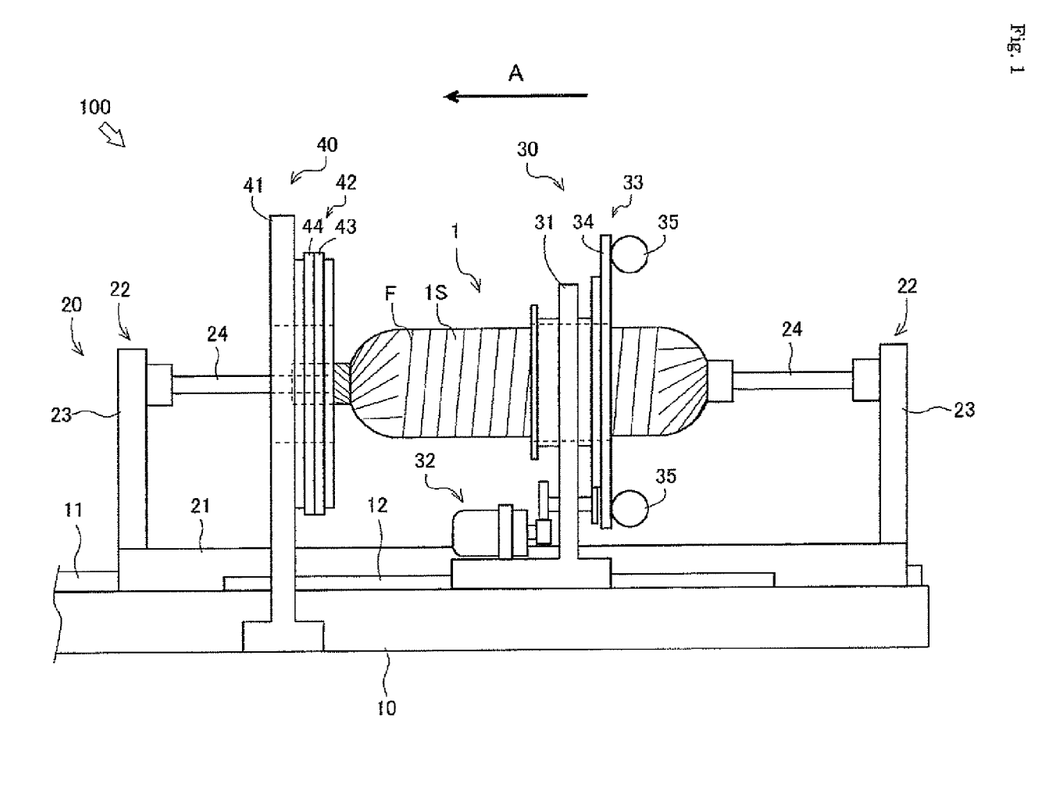
FIG. 1 is a drawing of a filament winding device 100 according to an embodiment of the present invention.

FIG. 1 is a side view of the FW device 100. An arrow A in the drawing shows a transport direction of a liner 1. The direction parallel to the transport direction of the liner 1 is defined as the longitudinal direction of the FW device 100, and one of the sides of the transport direction of the liner 1 is defined as the front side (left side in the drawing) and the other thereof is defined as the rear side (right side in the drawing). For moving reciprocally the liner 1 along the longitudinal direction, the front and rear sides of the FW device 100 is determined in accordance with the transport direction of the liner 1.

The FW device 100 winds a fiber bundle F around an outer peripheral surface 1S of the liner 1. The FW device 100 mainly includes a main pedestal 10, a liner transport device 20, a hoop winding device 30 and a helical winding device 40.

The liner 1 is a substantially cylindrical hollow vessel formed by high-intensity aluminum material, polyamide resin or the like for example. The pressure resistance of the liner 1 is improved by winding the fiber bundle F around the outer peripheral surface 1S of the liner 1. Namely, the liner 1 is a base material constituting a pressure-resistant vessel.

The main pedestal 10 is a main structure constituting the basis of the FW device 100. In the upper portion of the main pedestal 10, a rail 11 for the liner transport device is provided. The liner transport device 20 is mounted on the rail 11. In the upper portion of the main pedestal 10, a rail 12 for the hoop winding device is provided in parallel to the rail 11. The hoop winding device 30 is mounted on the rail 12.

According to the construction, while constituting the basis of the FW device 100, the main pedestal 10 enables the liner transport device 20 and the hoop winding device 30 to move along the longitudinal direction of the FW device 100.

The liner transport device 20 moves the liner 1 while rotating the liner 1. In detail, the liner transport device 20 rotates the liner 1 about the longitudinal direction of the FW device 100 as a rotation axis and transports the liner 1 along the longitudinal direction of the FW device 100. The liner transport device 20 mainly includes a pedestal 21 and liner support parts 22.

In the pedestal 21, a pair of the liner support parts 22 is provided in the upper portion of the pedestal 21. The liner support part 22 includes a liner support frame 23 and a rotational shaft 24, and rotates the liner 1.

Concretely, the liner support part 22 includes the liner support frame 23 extended upward from the pedestal 21, and the rotational shaft 24 extended longitudinally from the liner support frame 23. Then, the liner 1 attached to the rotational shaft 24 is rotated along one direction by a power mechanism (not shown).

According to the construction, the liner transport device 20 can rotate the liner 1 about the longitudinal direction of the FW device 100 as the rotation axis and can transport the liner 1 along the longitudinal direction of the FW device 100.

The hoop winding device 30 winds the fiber bundle F around the outer peripheral surface 1S of the liner 1. In detail, the hoop winding device 30 performs so-called hoop winding in which a winding angle θ of the fiber bundle F (see FIG. 2) is substantially perpendicular to the longitudinal direction of the FW device 100. The hoop winding device 30 mainly includes a pedestal 31, a power mechanism 32 and a hoop mounting device 33.

In the pedestal 31, the hoop mounting device 33 rotated by the power mechanism 32 is provided. The hoop mounting device 33 includes a mounting table 34 and a bobbin 35, and performs the hoop winding on the outer peripheral surface 1S of the liner 1.

Concretely, the hoop mounting device 33 mainly includes the mounting table 34 performing the hoop winding and the bobbin 35 supplying the fiber bundle F to the mounting table 34. The fiber bundle F is guided to the outer peripheral surface 1S of the liner 1 by a fiber bundle guide provided in the mounting table 34, and the hoop winding is performed by rotating the mounting table 34.

According to the construction, the hoop winding device 30 can perform the hoop winding in which the winding angle θ of the fiber bundle F (see FIG. 2) is substantially perpendicular to the longitudinal direction of the FW device 100. In the FW device 100, by controlling the moving speed of the hoop winding device 30 and the rotation speed of the mounting table 34, the winding mode of the fiber bundle F can be changed freely.

The helical winding device 40 winds the fiber bundle F around the outer peripheral surface 1S of the liner 1. In detail, the helical winding device 40 performs so-called helical winding in which the winding angle θ of the fiber bundle F (see FIG. 2) is a predetermined value about the longitudinal direction of the FW device 100. The helical winding device 40 mainly includes a pedestal 41 and a helical mounting device 42.

In the pedestal 41, the helical mounting device 42 is provided. The helical mounting device 42 includes a first helical head 43 and a second helical head 44, and performs the helical winding on the outer peripheral surface 1S of the liner 1.

Concretely, the helical mounting device 42 mainly includes the first helical head 43 performing the helical winding and the second helical head 44 also performing the helical winding. The fiber bundle F is guided to the outer peripheral surface 1S of the liner 1 by fiber bundle guides 80 provided in the first helical head 43 and the second helical head 44 (see FIG. 2), and the helical winding is performed by the passing of the liner 1 while rotating. The fiber bundle F is supplied to the first helical head 43 and the second helical head 44 by a bobbin (not shown).

According to the construction, the helical winding device 40 can perform the helical winding in which the winding angle θ of the fiber bundle F (see FIG. 2) is a predetermined value about the longitudinal direction of the FW device 100. In the FW device 100, by controlling the transport speed and rotation speed of the liner 1, the winding mode of the fiber bundle F can be changed freely.

Next, an explanation will be given on the first helical head 43 and the second helical head 44 constituting the helical winding device 40 in more detail referring to FIG. 2.

Figure 2:
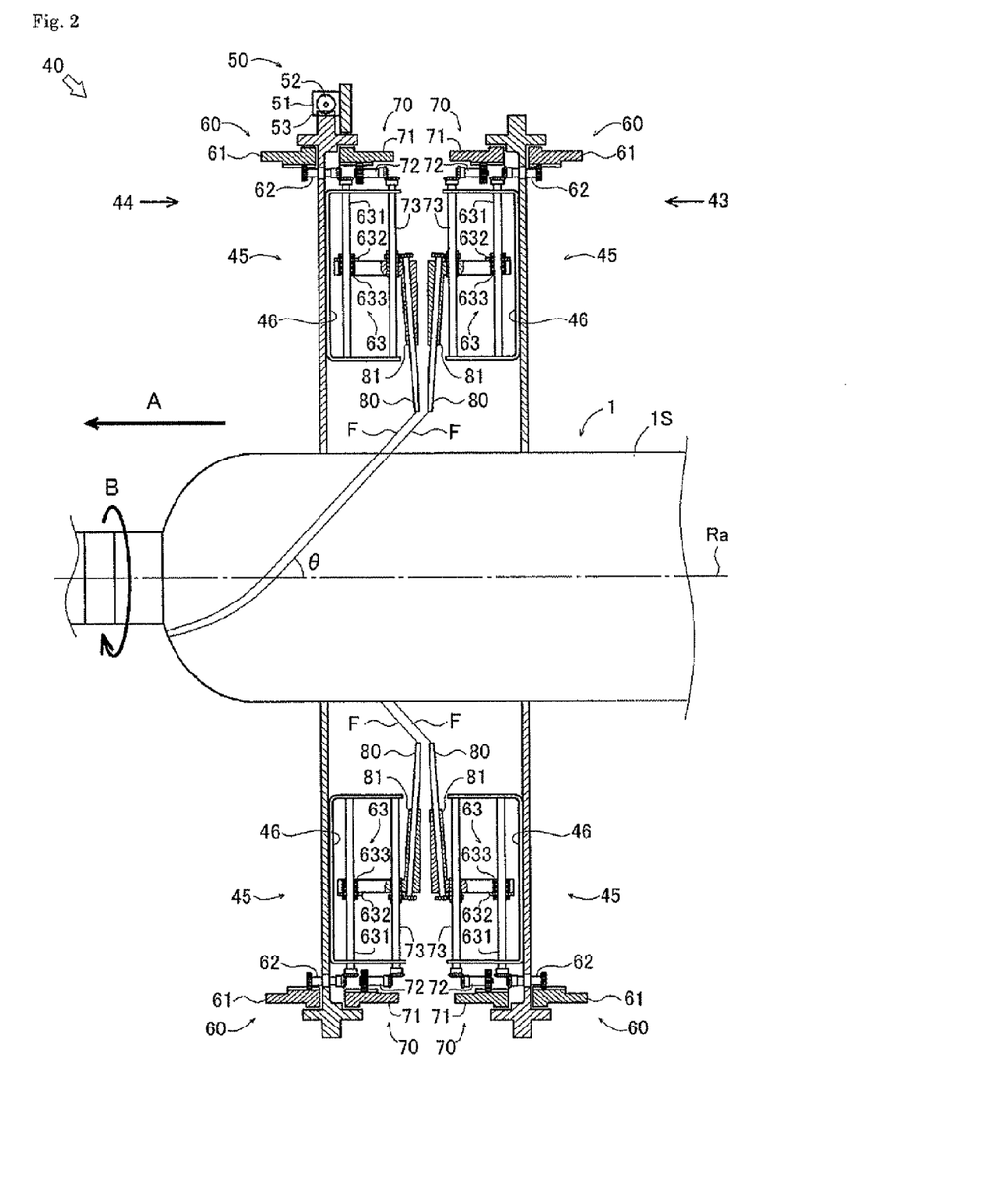
FIG. 2 is a drawing of a first helical head 43 and a second helical head 44 constituting a helical winding device 40.

FIG. 2 is a side view of the first helical head 43 and the second helical head 44. An arrow A in the drawing shows a transport direction of the liner 1. An arrow B in the drawing shows a rotation direction of the liner 1.

As mentioned above, the helical winding device 40 performs the helical winding in which the winding angle θ of the fiber bundle F is a predetermined value about the longitudinal direction of the FW device 100. The first helical head 43 and the second helical head 44 constituting the helical winding device 40 are arranged so as to be adjacent to each other along the transport direction of the liner 1. Namely, the helical winding device 40 provided in the FW device 100 is constructed so that two lines of the fiber bundle guides 80 are arranged along the transport direction of the liner 1.

In the first helical head 43, the fiber bundle guides 80 are provided radially centering on a rotational axis Ra of the liner 1. Concretely, by guide support devices 45 attached radially to the first helical head 43, the fiber bundle guides 80 are supported movably and rotatably.

Accordingly, the first helical head 43 can guide the plurality of the fiber bundles F simultaneously to the outer peripheral surface 1S of the liner 1. Since the 90 fiber bundle guides 80 are provided in the first helical head 43 of the FW device 100, the 90 fiber bundles F can be guided simultaneously.

In the second helical head 44, the fiber bundle guides 80 are provided radially centering on the rotational axis Ra of the liner 1. Concretely, by guide support devices 45 attached radially to the second helical head 44, the fiber bundle guides 80 are supported movably and rotatably.

Accordingly, the second helical head 44 can guide the plurality of the fiber bundles F simultaneously to the outer peripheral surface 1S of the liner 1. Since 90 fiber bundle guides 80 are provided in the second helical head 44 of the FW device 100, 90 fiber bundles F can be guided simultaneously.

According to the construction, the first helical head 43 and the second helical head 44 can guide the plurality of the fiber bundles F (in the FW device 100, 180 fiber bundles F) simultaneously to the outer peripheral surface 1S of the liner 1 so as to perform the helical winding.

In the FW device 100, a phase adjusting means 50 driving the second helical head 44 along the peripheral direction of the liner 1 is provided. In other words, in the FW device 100, the phase adjusting means 50 drives the second helical head 44 centering on the rotational axis Ra of the liner 1.

A driving device 50 as the phase adjusting means 50 includes a worm gear 52 rotated by an electric motor 51 and a rack gear 53 fixed to the second helical head 44. The driving device 50 drives the second helical head 44 by the rotational power of the electric motor 51.

Figure 5:
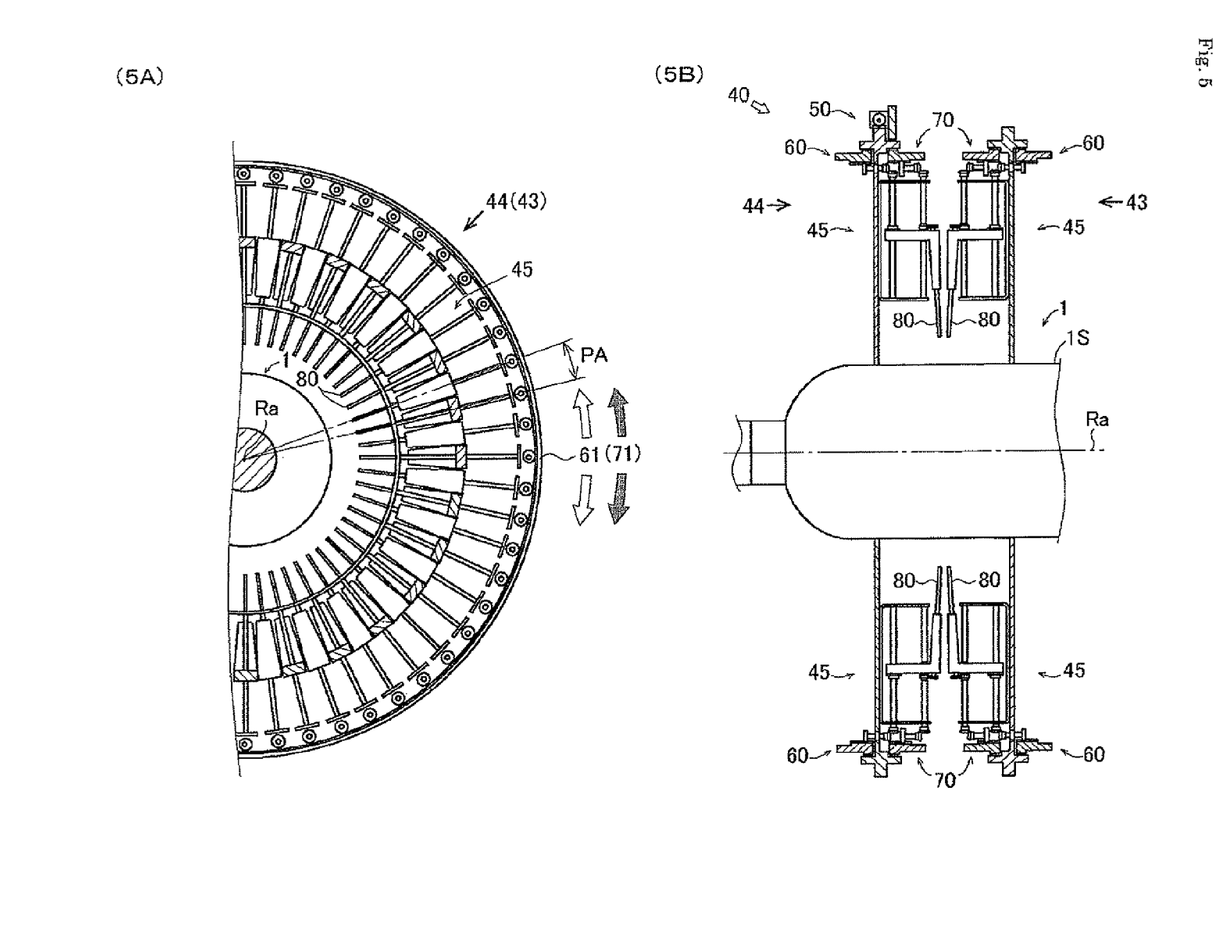
FIGS. 5A and 5B are front and side views of the first helical head 43 and the second helical head 44 when the transport speed and the peripheral speed of the liner 1 are the predetermined values.

According to the construction, the driving device 50 can drive the second helical head 44 along the peripheral direction of the liner 1 so as to adjust a phase difference PA between the fiber bundle guides 80 of the first helical head 43 and the fiber bundle guides 80 of the second helical head 44 (see FIG. 5A).

In below explanation, the first helical head 43 which is fixed to the pedestal 41 and is not driven is defined as a fixed helical head 43, and the second helical head 44 which is driven by the driving device 50 is defined as a movable helical head 44.

Next, an explanation will be given on the guide support devices 45 constituting the fixed helical head 43 and the movable helical head 44 in more detail referring to FIG. 3. Herein, the guide support device 45 attached to the movable helical head 44 is shown in the drawing and explained.

Figure 3:
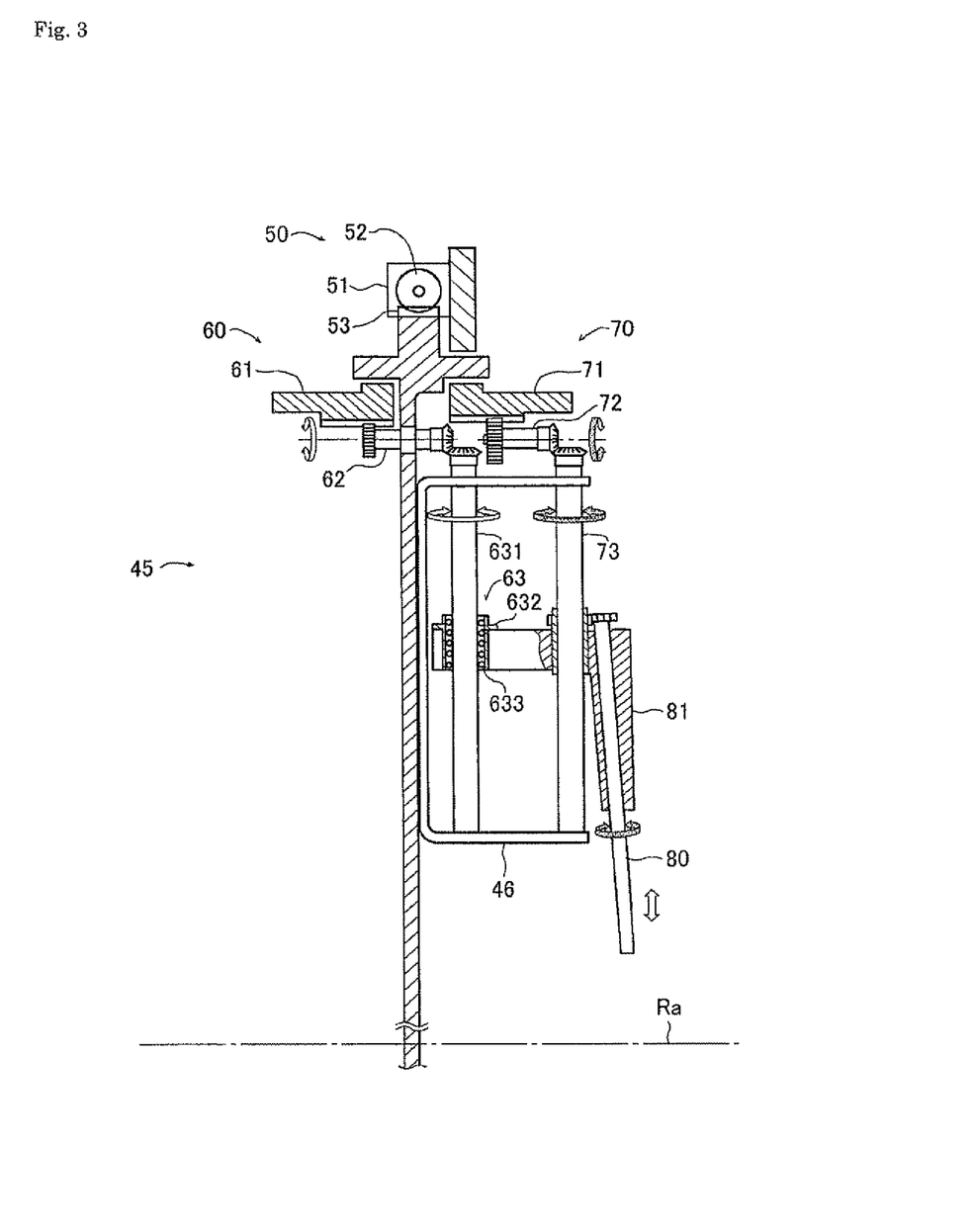
FIG. 3 is a drawing of a guide support device 45 constituting the first helical head 43 and the second helical head 44.

FIG. 3 is a side view of the guide support device 45. Outlined white arrows in the drawing show action directions of members constituting a movement mechanism 60. Outlined black arrows in the drawing show action directions of members constituting a rotation mechanism 70.

The guide support device 45 is attached to each of the fixed helical head 43 and the movable helical head 44 so as to support the fiber bundle guides 80 movably and rotatably. The guide support device 45 includes the movement mechanism 60 and the rotation mechanism 70.

The movement mechanism 60 moves the fiber bundle guides 80 substantially perpendicularly to the rotational axis Ra of the liner 1. The movement mechanism 60 mainly includes a rotational cylinder 61, an intermediate shaft 62 and a ball screw 63.

The rotational cylinder 61 is a circular member whose inner peripheral surface is formed therein with an internal gear. The rotational cylinder 61 is arranged coaxially to the rotational axis Ra of the liner 1 and is rotated by an electric motor (not shown) (see the outlined white arrow in FIG. 5A). The rotational direction of the rotational cylinder 61 is changed by the normal or reverse rotation the electric motor.

The intermediate shaft 62 is a shaft-like member transmitting the rotational action of the rotational cylinder 61 to a spiral shaft 631 constituting the ball screw 63. A pinion gear provided at one of the ends of the intermediate shaft 62 is meshed with the internal gear of the rotational cylinder 61. A bevel gear provided at the other end of the intermediate shaft 62 is meshed with a bevel gear of the spiral shaft 631.

The ball screw 63 exchanges the rotational action of the spiral shaft 631 rotated by the intermediate shaft 62 into sending action of a guide support member 81. Hereinafter, an explanation will be given on the structure of the ball screw 63 in more detail. The ball screw 63 mainly includes the spiral shaft 631, a ball nut 632 and steel balls 633.

The spiral shaft 631 is a shaft-like member rotated by the intermediate shaft 62. In the outer peripheral surface of the spiral shaft 631, a groove which is shaped arc-like when viewed in section is bore spirally. The spiral shaft 631 is supported rotatably by a circular member 46 which is C-like shaped when viewed in section.

The ball nut 632 is a cylindrical member engaged with the outside of the spiral shaft 631. In the inner peripheral surface of the ball nut 632, a groove which is shaped arc-like when viewed in section is bore spirally. Then, the ball nut 632 is inserted into a through-hole provided in the guide support member 81 and is fixed. The groove bored in the inner peripheral surface of the ball nut 632 faces the groove bored in the outer peripheral surface of the spiral shaft 631 so as to form a spiral space which is circular when viewed in section.

Each of the steel balls 633 is a spherical member interposed in the spiral space. The steel balls 633 are pinched between the groove bored in the spiral shaft 631 and the groove bored in the ball nut 632. Since the plurality of the steel balls 633 are interposed in the spiral space, the ball nut 632 is not shaky.

According to the construction, the movement mechanism 60 can transmit the rotational power of the electric motor via the rotational cylinder 61 and the intermediate shaft 62 to the spiral shaft 631 and exchange the rotational action of the spiral shaft 631 into the sending action of the guide support member 81. Accordingly, the movement mechanism 60 realizes the sending action of the guide support member 81 so as to move the fiber bundle guides 80, which is supported by the guide support member 81, substantially perpendicularly to the rotational axis Ra of the liner 1.

The rotation mechanism 70 rotates the fiber bundle guide 80 centering on the axis of the fiber bundle guide 80. The rotation mechanism 70 mainly includes a rotational cylinder 71, an intermediate shaft 72 and a driving shaft 73.

The rotational cylinder 71 is a circular member whose inner peripheral surface is formed therein with an internal gear. The rotational cylinder 71 is arranged coaxially to the rotational axis Ra of the liner 1 and is rotated by an electric motor (not shown) (see the outlined black arrow in FIG. 5A). The rotational direction of the rotational cylinder 71 is changed by the normal or reverse rotation the electric motor.

The intermediate shaft 72 is a shaft-like member transmitting the rotational action of the rotational cylinder 71 to the driving shaft 73. A pinion gear provided at one of the ends of the intermediate shaft 72 is meshed with the internal gear of the rotational cylinder 71. A bevel gear provided at the other end of the intermediate shaft 72 is meshed with a bevel gear of the driving shaft 73.

The driving shaft 73 is a shaft-like member transmitting the rotational action of the intermediate shaft 72 to the fiber bundle guide 80. The bevel gear provided at one of the ends of the driving shaft 73 is meshed with the bevel gear of the intermediate shaft 72 as mentioned above. A driving gear engaged with the outside of the driving shaft 73 is meshed with a driven gear of the fiber bundle guide 80. The driving shaft 73 is supported rotatably by the circular member 46 which is C-like shaped when viewed in section.

According to the construction, the rotation mechanism 70 can transmit the rotational power of the electric motor to the driving shaft 73 via the rotational cylinder 71 and the intermediate shaft 72 so as to rotate the driving gear meshed with the driven gear of the fiber bundle guide 80. Accordingly, the rotation mechanism 70 can rotate the fiber bundle guide 80, which is supported by the guide support member 81, centering on the axis of the fiber bundle guide 80.

An explanation will be given on the reason how the fiber bundles F can be wound around the outer peripheral surface 1S of the liner 1 at equal intervals in the FW device 100 constructed as the above.

Firstly, an explanation will be given on the case in which the winding angle θ of the fiber bundle F is not changed from a predetermined value.

Figure 4:
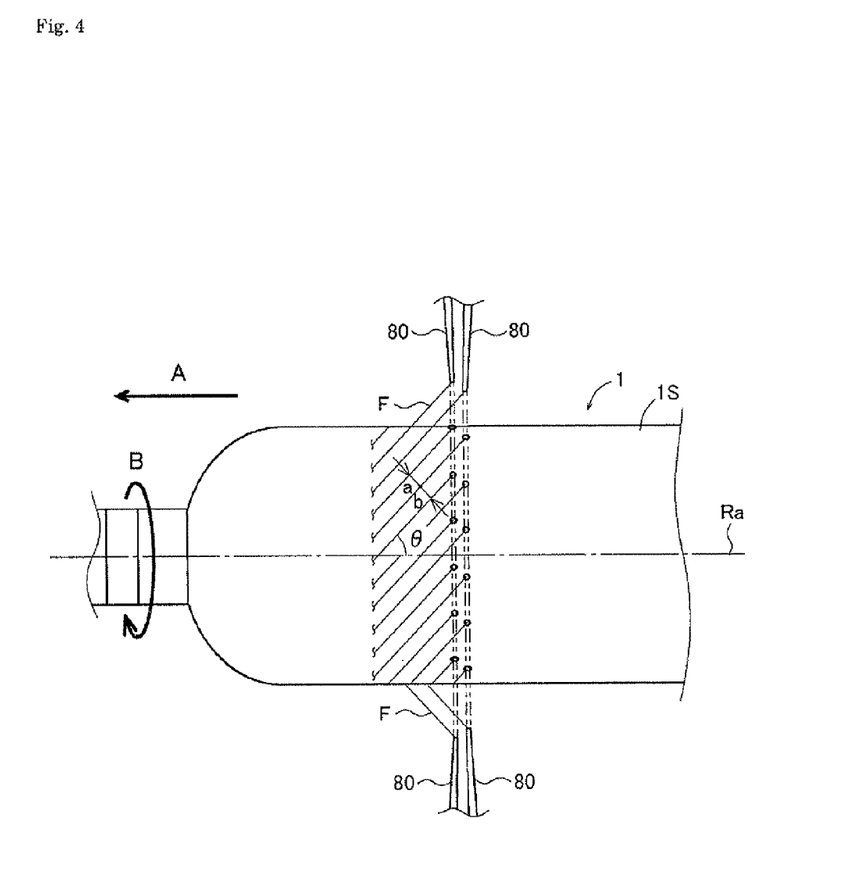
FIG. 4 is a drawing of a winding angle θ of a fiber bundle F when a transport speed and a peripheral speed of a liner 1 are predetermined values.

FIG. 4 is a drawing of the winding angle θ of the fiber bundle F when a transport speed and a peripheral speed of the liner 1 are predetermined values. An arrow A in the drawing shows the transport direction of the liner 1. An arrow B in the drawing shows the rotation direction of the liner 1. Furthermore, FIG. 5A and FIG. 5B are front and side views of the fixed helical head 43 and the movable helical head 44 in this case.

As shown in FIG. 4, when the transport speed and the peripheral speed of the liner 1 are fixed at the predetermined values, the winding angle θ of the fiber bundle F is also fixed at a predetermined value. In this case, the phase difference PA between the fiber bundle guides 80 of the fixed helical head 43 and the fiber bundle guides 80 of the movable helical head 44 (see FIG. 5A) is set so as to make the fiber bundles F wound around the outer peripheral surface 1S of the liner 1 be at equal intervals (see FIG. 4: a=b).

According to the construction, in the FW device 100, the fiber bundles F guided by the fiber bundle guides 80 of the movable helical head 44 can be drawn to a middle position between the fiber bundles F guided by the fiber bundles 80 of the fixed helical head 43. Accordingly, the fiber bundles F can be wound around the outer peripheral surface 1S of the liner 1 at equal intervals in the FW device 100.

Next, an explanation will be given on the case in which the winding angle θ of the fiber bundle F is changed from a predetermined value.

Figure 6:
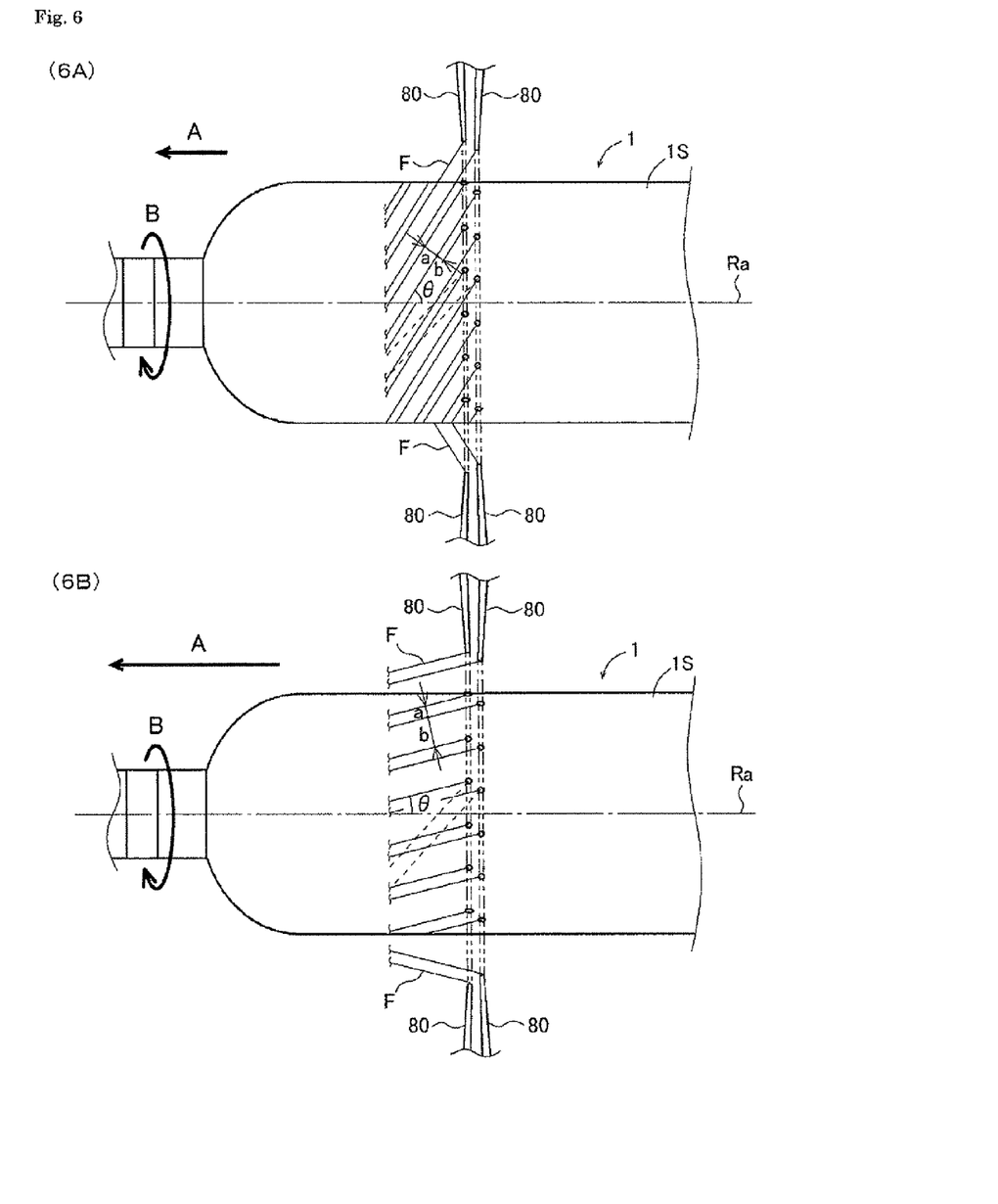
FIGS. 6A and 6B are drawings of the winding angle θ of the fiber bundle F when the transport speed of the liner 1 is changed from the predetermined value.
Figure 7:
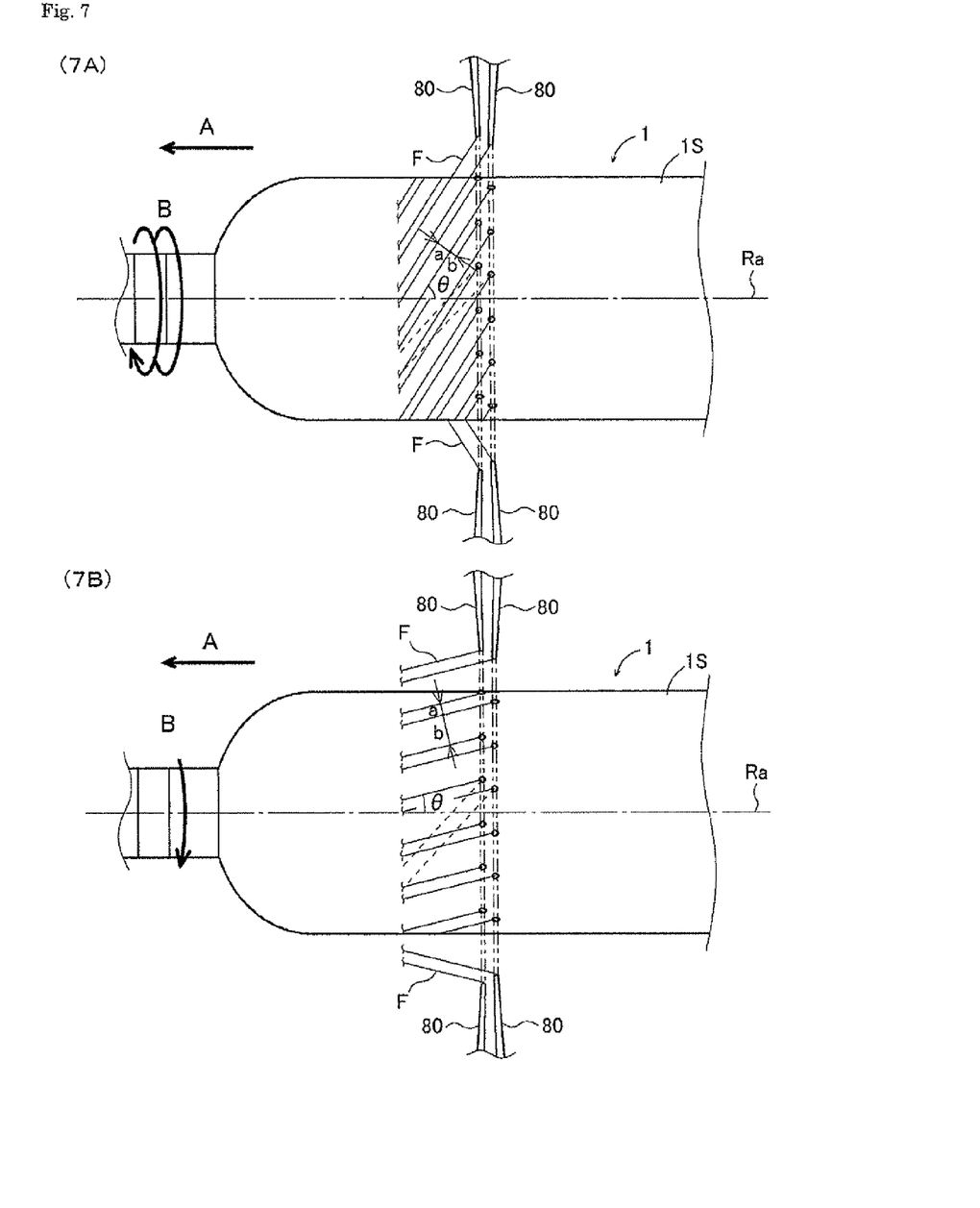
FIGS. 7A and 7B are drawings of the winding angle θ of the fiber bundle F when the peripheral speed of the liner 1 is changed from the predetermined value.

FIG. 6A and FIG. 6B are drawings of the winding angle θ of the fiber bundle F when the transport speed of the liner 1 is changed from the predetermined value. FIG. 7A and FIG. 7B are drawings of the winding angle θ of the fiber bundle F when the peripheral speed of the liner 1 is changed from the predetermined value. An arrow A in the drawing shows the transport direction of the liner 1. An arrow B in the drawing shows the rotation direction of the liner 1. Dashed lines in the drawings show the fiber bundle F when the transport speed and the peripheral speed of the liner 1 are not changed from the predetermined values.

As shown in FIG. 6A and FIG. 6B, when the transport speed of the liner 1 is changed, the winding angle θ of the fiber bundle F is also changed. For example, as shown in FIG. 6A, when the transport speed of the liner 1 is reduced, the winding angle θ of the fiber bundle F is increased. As shown in FIG. 6B, when the transport speed of the liner 1 is increased, the winding angle θ of the fiber bundle F is reduced.

Then, in accordance with the change of the winding angle θ of the fiber bundle F, the fiber bundles F are not wound around the outer peripheral surface 1S of the liner 1 at equal intervals and are inclined. Namely, the fiber bundles F guided by the fiber bundle guides 80 of the movable helical head 44 cannot be drawn to a middle position between the fiber bundles F guided by the fiber bundle guides 80 of the fixed helical head 43, whereby the fiber bundles F cannot be wound at equal intervals (see FIG. 6A and FIG. 6B: a≠b).

On the other hand, as shown in FIG. 7A and FIG. 7B, when the peripheral speed of the liner 1 is changed, the winding angle θ of the fiber bundle F is also changed. For example, as shown in FIG. 7A, when the peripheral speed of the liner 1 is increased, the winding angle θ of the fiber bundle F is increased. As shown in FIG. 7B, when the peripheral speed of the liner 1 is reduced, the winding angle θ of the fiber bundle F is reduced.

Then, in accordance with the change of the winding angle θ of the fiber bundle F, the fiber bundles F are not wound around the outer peripheral surface 1S of the liner 1 at equal intervals and are inclined. Namely, the fiber bundles F guided by the fiber bundle guides 80 of the movable helical head 44 cannot be drawn to a middle position between the fiber bundles F guided by the fiber bundle guides 80 of the fixed helical head 43, whereby the fiber bundles F cannot be wound at equal intervals (see FIG. 7A and FIG. 7B: a≠b).

Then, in the FW device 100, by adjusting the phase difference PA between the fiber bundle guides 80 of the fixed helical head 43 and the fiber bundle guides 80 of the movable helical head 44 (see FIG. 5A), the fiber bundles F can be wound around the outer peripheral surface 1S of the liner 1 at equal intervals.

Figure 9:
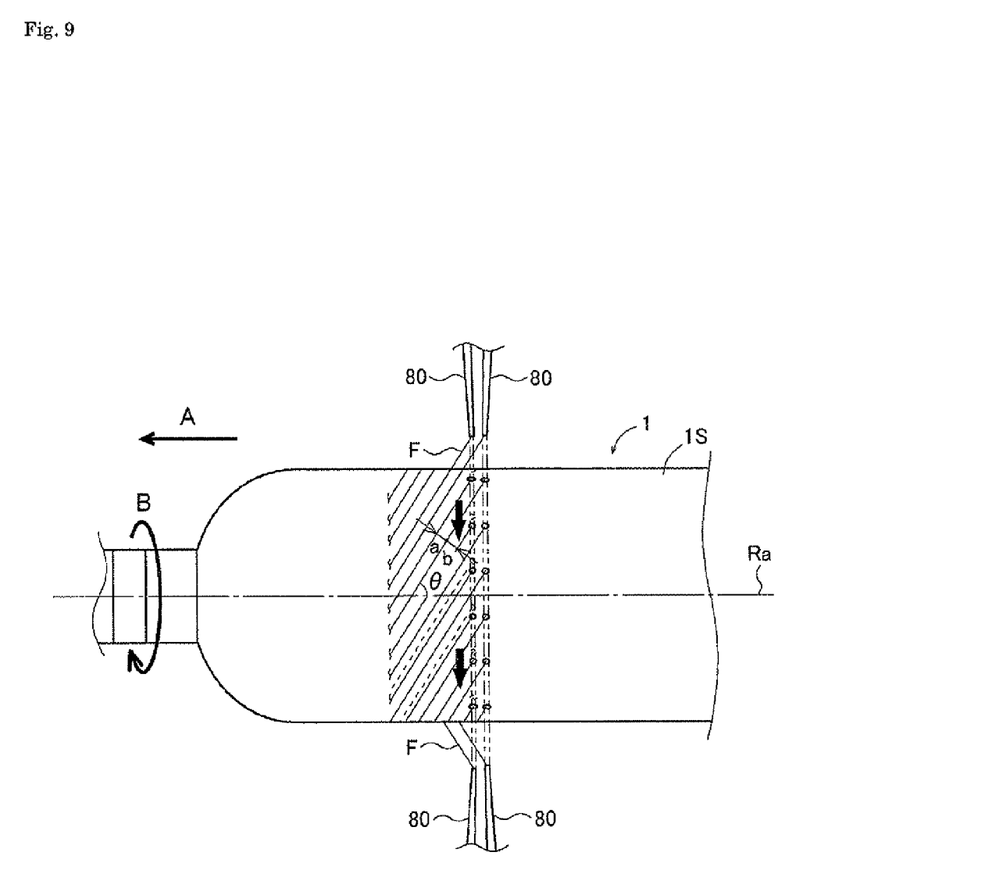
FIG. 9 is a drawing in that the phase difference PA between the fiber bundle guide 80 of the first helical head 43 and the fiber bundle guide 80 of the second helical head 44 is reduced so as to wind the fiber bundle F at equal intervals.

Concretely, as shown in FIG. 6A and FIG. 7A, when the winding angle θ of the fiber bundle F is larger than the predetermined value, the phase difference PA between the fiber bundle guides 80 of the fixed helical head 43 and the fiber bundle guides 80 of the movable helical head 44 (see FIG. 5A) is reduced by driving the movable helical head 44. Accordingly, as shown in FIG. 9, the fiber bundles F guided by the fiber bundle guides 80 of the movable helical head 44 can be shifted to the peripheral direction of the liner 1. Thick black arrows in FIG. 9 show the driving direction of the movable helical head 44. Dashed lines in FIG. 9 show the fiber bundle F before driving the movable helical head 44.

Figure 8:
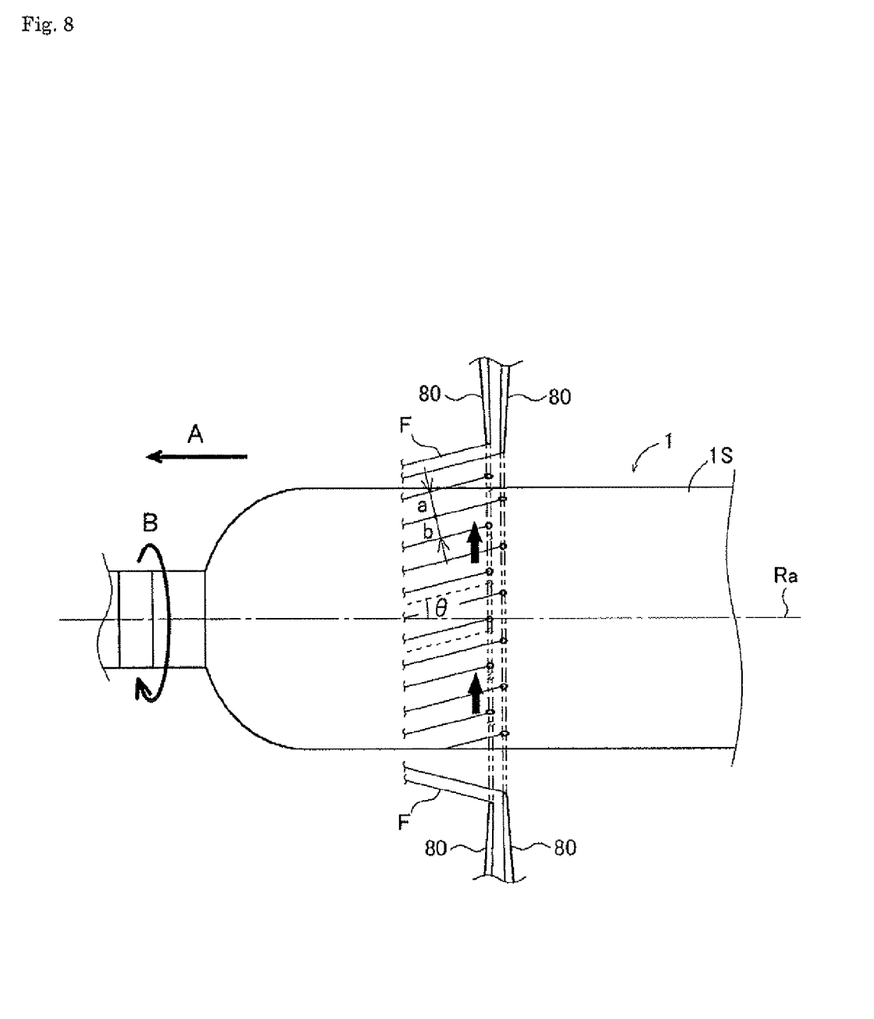
FIG. 8 is a drawing in that a phase difference PA between a fiber bundle guide 80 of the first helical head 43 and a fiber bundle guide 80 of the second helical head 44 is increased so as to wind the fiber bundle F at equal intervals.

As shown in FIG. 6B and FIG. 7I3, when the winding angle θ of the fiber bundle F is smaller than the predetermined value, the phase difference PA between the fiber bundle guides 80 of the fixed helical head 43 and the fiber bundle guides 80 of the movable helical head 44 (see FIG. 5A) is increased by driving the movable helical head 44. Accordingly, as shown in FIG. 8, the fiber bundle F guided by the fiber bundle guides 80 of the movable helical head 44 can be shifted to the peripheral direction of the liner 1. Thick black arrows in FIG. 8 show the driving direction of the movable helical head 44. Dashed lines in FIG. 8 show the fiber bundle F before driving the movable helical head 44.

According to the construction, in the FW device 100, the fiber bundles F guided by the fiber bundle guides 80 of the movable helical head 44 can be drawn to a middle position between the fiber bundles F guided by the fiber bundle guides 80 of the fixed helical head 43. Accordingly, the fiber bundles F can be wound around the outer peripheral surface 1S of the liner 1 at equal intervals in the FW device 100 (see FIG. 8 and FIG. 9: a=b).

According to the above, in the FW device 100, when the transport speed or the peripheral speed of the liner 1 is changed, the fiber bundles F can be wound around the outer peripheral surface 1S of the liner 1 at equal intervals. For example, when the peripheral speed is not uniform between the case in which the fiber bundle F is wound round a part of the liner 1 with large outer diameter and the case in which the fiber bundle F is wound around a part of the liner 1 with small outer diameter, the fiber bundles F can be wound at equal intervals. When the transport direction of the liner 1 is changed and the longitudinal direction is reversed, the fiber bundles F can be wound at equal intervals.

Hereinafter, an explanation will be given on a method for calculating the phase difference PA between the fiber bundle guides 80 of the fixed helical head 43 and the fiber bundle guides 80 of the movable helical head 44 when the fiber bundles F are wound at equal intervals.

As mentioned above, the phase difference PA between the fiber bundle guides 80 of the fixed helical head 43 and the fiber bundle guides 80 of the movable helical head 44 is determined based on the winding angle θ of the fiber bundle F.

Figure 10:
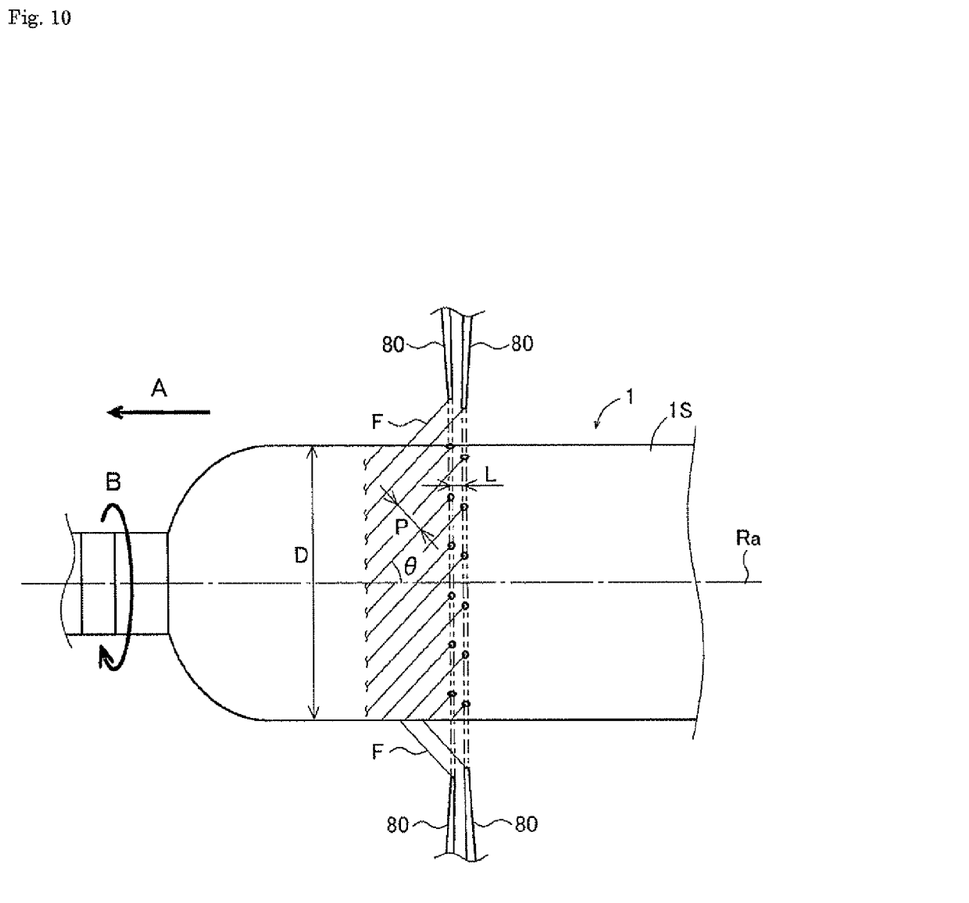
FIG. 10 is a drawing of a method for calculating the phase difference PA between the fiber bundle guide 80 of the first helical head 43 and the fiber bundle guide 80 of the second helical head 44.

Herein, as shown in FIG. 10, the outer diameter of the liner 1 is determined as D, and the number of the fiber bundle guides 80 provided in the fixed helical head 43 (the movable helical head 44) is determined as N. The distance between the fiber bundle guides 80 of the fixed helical head 43 and the fiber bundle guides 80 of the movable helical head 44 in the longitudinal direction is determined as L.

Then, the distance P between the fiber bundles F drawn by the fiber bundle guides 80 of the fixed helical head 43 (the movable helical head 44) is expressed with below formula.

$$P = \pi * D/(\tan\theta * N)$$

The driving amount X of the movable helical head 44 by the driving device 50 is expressed with below formula.

$$X = P/2 - (\text{the remainder of } L/P)$$

Accordingly, the phase difference PA between the fiber bundle guides 80 of the fixed helical head 43 and the fiber bundle guides 80 of the movable helical head 44 can be expressed with below formula.

$$PA = X/P * 360 + /N$$

INDUSTRIAL APPLICABILITY

The filament winding device according to the present invention can change winding mode of fiber bundles so that the fiber bundles can be wound around an outer peripheral surface of a liner at equal intervals, whereby the filament winding device is useful industrially.

Description of Notations
 1 liner
 1S outer peripheral surface
 10 main pedestal
 20 liner transport device
 30 hoop winding device
 40 helical winding device
 43 first helical head (fixed helical head)
 44 second helical head (movable helical head)
 45 guide support device
 50 phase adjusting means (driving device)
 51 electric motor
 52 worm gear
 53 rack gear
 60 movement mechanism
 61 rotational cylinder
 62 intermediate shaft
 63 ball screw
 70 rotation mechanism
 71 rotational cylinder
 72 intermediate shaft
 73 driving shaft
 80 fiber bundle guide
 81 guide support member
 100 filament winding device (FW device)
 F fiber bundle
 PA phase difference
 θ winding angle

The invention claimed is:
1. A filament winding device comprising:
a first helical head in which fiber bundle guides are provided radially around a transported liner;
a second helical head adjacent to the first helical head and in which fiber bundle guides are provided radially around the transported liner; and
a phase adjusting means that adjusts a phase difference between the fiber bundle guides of the first helical head and the fiber bundle guides of the second helical head in accordance with a winding angle of fiber bundles, wherein
the phase difference between the fiber bundle guides of the first helical head and the fiber bundle guides of the second helical head is regarded as a standard in the case in which the fiber bundles wound around an outer peripheral surface of the liner are arranged at equal intervals, when the winding angle of the fiber bundles is a predetermined value, and
when the winding angle of the fiber bundles is larger than the predetermined value, the phase adjusting means drives the first helical head or the second helical head so as to reduce the phase difference between the fiber bundle guides of the first helical head and the fiber bundle guides of the second helical head, whereby the fiber bundles are wound at equal intervals.

2. A filament winding device comprising:

a first helical head in which fiber bundle guides are provided radially around a transported liner;

a second helical head adjacent to the first helical head and in which fiber bundle guides are provided radially around the transported liner; and a phase adjusting means that adjusts a phase difference between the fiber bundle guides of the first helical head and the fiber bundle guides of the second helical head in accordance with a winding angle of fiber bundles, wherein the phase difference between the fiber bundle guides of the first helical head and the fiber bundle guides of the second helical head is regarded as a standard in the case in which the fiber bundles wound around an outer peripheral surface of the liner are arranged at equal intervals, when the winding angle of the fiber bundles is a predetermined value, and when the winding angle of the fiber bundles is smaller than the predetermined value, the phase adjusting means drives the first helical head or the second helical head so as to increase the phase difference between the fiber bundle guides of the first helical head and the fiber bundle guides of the second helical head, whereby the fiber bundles are wound at equal intervals.

* * * * *